US000001922H

United States Statutory Invention Registration [19]

[11] Reg. Number: H1,922

Fusco et al.

[45] Published: Nov. 7, 2000

[54] COATING COMPOSITION

[75] Inventors: James Vincent Fusco, Red Bank; Donald Frederick Kruse, West New York; Irwin Jerome Gardner, Scotch Plains, all of N.J.

[73] Assignee: Exxon Chemical Patents Inc., Linden, N.J.

[21] Appl. No.: 08/180,003

[22] Filed: Jan. 11, 1994

Related U.S. Application Data

[63] Continuation of application No. 07/970,439, Nov. 2, 1992, abandoned, which is a continuation of application No. 07/725,127, Jul. 3, 1991, abandoned.

[51] Int. Cl.[7] ..... C08K 3/00

[52] U.S. Cl. ..... 524/496; 524/525; 524/527; 524/576; 524/577; 524/578; 524/579; 525/333.2; 525/333.4; 525/356; 526/293; 526/294; 526/295; 526/296

[58] Field of Search ..... 524/496, 578, 524/579, 525, 527, 576, 577; 525/333.4, 356, 333.2; 526/293, 294, 295, 296

[56] References Cited

U.S. PATENT DOCUMENTS 5,063,268 11/1991 Young ..... 525/333.4
5,100,947 3/1992 Puydak et al. ..... 524/504

*Primary Examiner*—Donald P. Walsh
*Assistant Examiner*—Chrisman D. Carroll
*Attorney, Agent, or Firm*—Myron B. Kurtzman

[57] ABSTRACT

A composition suitable for coating fabrics is provided. The composition comprises a halogen-containing copolymer of a $C_4$ to $C_7$ isomonoolefin and a para-alkylstyrene; a filler; a processing aid, and a curing agent. A fabric coated with the composition is also provided.

19 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COATING COMPOSITION

This is a continuation of application Ser. No. 07/970,439, filed Nov. 2, 1992, now abandoned which is a continuation of application Ser. No. 07/725,127, filed Jul. 3, 1991, now abandoned.

BACKGROUND OF THE INVENTION

1. Field of the Invention

The present invention relates to a coating for fabrics.

2. Description of Information Disclosures

The use of isobutylene polymers such as butyl rubber as a low permeability coating for fabrics used in protective coating and protective gloves and boots is well known.

In some of these uses, there is a need for improved durability, aging, ozone and chemical resistance while maintaining the low permeability characteristics typical of butyl rubber.

It has now been found that coating compositions comprising certain halogen-containing copolymers of a $C_4$ to $C_7$ isomonoolefin and a para-alkylstyrene have improved properties, such as better aging, better ozone and chemical resistance while maintaining the low permeability characteristic of the polyisoolefin backbone.

SUMMARY OF THE INVENTION

In accordance with the invention, there is provided a coating composition comprising: (1) a halogen-containing copolymer of a $C_4$ to $C_7$ isomonoolefin and a para-alkylstyrene; (2) a filler; (3) a processing aid; and (4) a curing agent.

In accordance with the invention, there is also provided a fabric coated with a vulcanized composition comprising: (1) a halogen-containing copolymer of a $C_4$ to $C_7$ isomonoolefin and a para-alkylstyrene; (2) a filler; and (3) a processing aid.

BRIEF DESCRIPTION OF THE DRAWING

The sole FIGURE is a graph in which the glass transition temperature, Tg/°C., is plotted against the content of para-methylstyrene (PMS) moieties of various copolymers of isobutylene and para-methylstyrene.

DETAILED DESCRIPTION OF THE INVENTION

Figure 1:
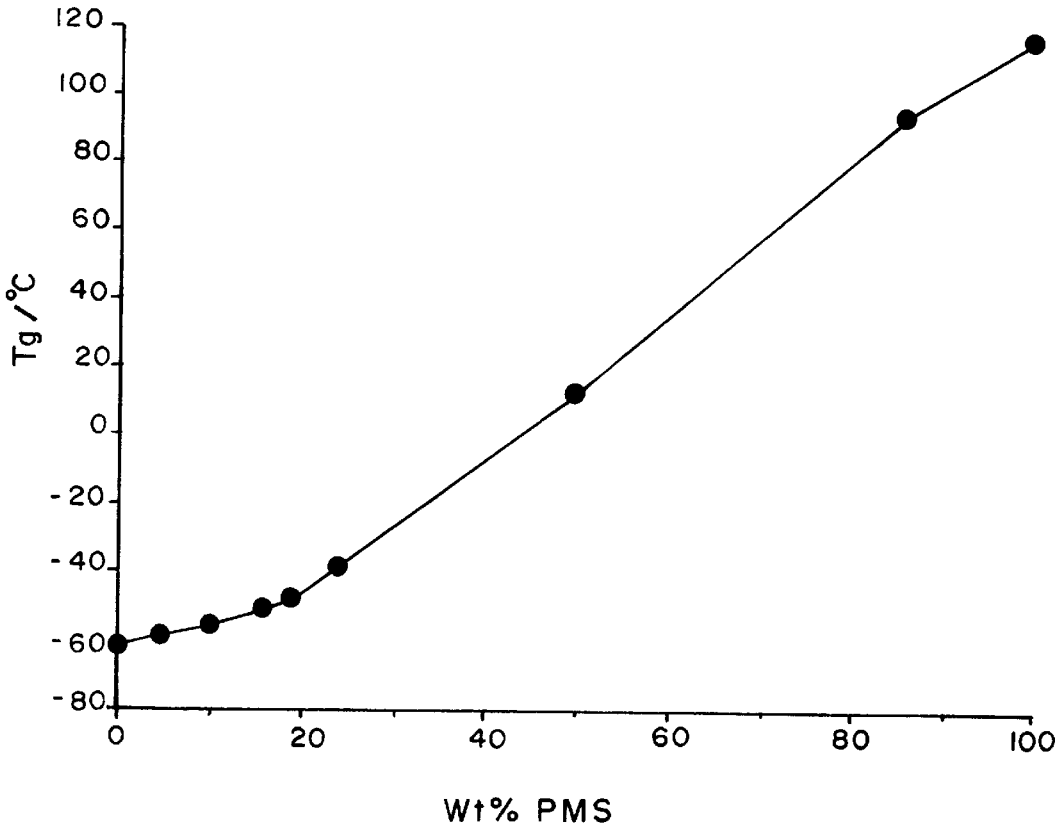

The coating composition of the present invention comprises a halogen-containing copolymer of a $C_4$ to $C_7$ isomonoolefin and a para-alkylstyrene, a filler, a process oil and a curing agent with or without curing agent modifiers. Optionally, the composition may comprise other rubber compounding additives and other rubber components.

Suitable halogen-containing copolymers of a $C_4$ to $C_7$ isomonoolefin and a para-alkylstyrene for use as a component of the present coating composition comprise at least 0.5 weight percent of the para-alkylstyrene moiety. For elastomeric copolymer products, the para-alkylstyrene moiety may range from about 0.5 weight percent to about 20 weight percent, preferably from about 1 to about 20 weight percent, more preferably from about 2 to about 20 weight percent of the copolymer, most preferably at least about 5 weight percent. The halogen content of the copolymers may range from an effective amount above zero to about 7.5 weight percent, preferably from about 0.1 to about 7.5 weight percent, more preferably from 0.8 weight percent to 7.5 weight percent. The halogen may be bromine, chlorine, and mixtures thereof. Preferably, the halogen is bromine. The major portion of the halogen is chemically bound to the alkyl group in the para position of the para-alkylstyrene, that is, the halogen-containing copolymer comprises para-halo alkyl groups.

The copolymers of the isomonoolefin and para-alkylstyrene useful to prepare the halogen-containing copolymers suitable as component of the coating composition of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises para-methylstyrene. Suitable copolymers of an isomonoolefin and a para-alkyl styrene include copolymers having a number average molecular weight ($\overline{M}n$) of at least about 25,000, preferably at least about 30,000, more preferably at least about 100,000. The copolymers also, preferably, have a ratio of weight average molecular weight ($\overline{M}w$) to number average molecular weight ($\overline{M}n$), i.e., $\overline{M}w/\overline{M}n$ of less than about 6, preferably less than about 4, more preferably less than about 2.5, most preferably less than about 2. The brominated copolymer of the isoolefin and para-alkylstyrene produced by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction, the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

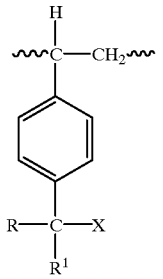

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40 to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that free radical bromination of the enchained para-methyl styryl moiety in the useful copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected free radical initiators (according to conditions, i.e., a particular free radical initiator must be selected which has an appropriate half-life for the particular temperature conditions being utilized, with generally longer half-lives preferred at warmer halogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azo bis isobutyronitrile (AIBN), azo bis (2,4-dimethyl-valero) nitrile, azo bis (2-methyl-butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene is highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO® 52: 2,2'-azobis(2,4-dimethylpentane nitrile), at about 55 to 80° C., for a time period ranging from about 4.5 to about 30 minutes, followed by a caustic quench. The recovered polymer is washed in basic water wash and water/isopropanol washes, recovered, stabilized and dried.

In addition to the halogen-containing copolymer of a $C_4$ to $C_7$ isomonoolefin and a para-alkylstyrene, the coating composition of the present invention also comprises a filler, a processing aid, and a curing agent. Optionally, the composition may comprise a rubber component of certain rubbers other than the halogen-containing copolymer of a $C_4$ to $C_7$ isomonoolefin and the para-alkylstyrene.

Suitable optional rubber components for the composition of the present invention, in addition to the halogen-containing copolymer of the isomonoolefin and the para-alkylstyrene, include rubbers selected from the group consisting of a copolymer of a $C_4$ to $C_7$ isomonoolefin and a $C_4$ to $C_{14}$ multiolefin (butyl rubber), a halogenated copolymer of a $C_4$ to $C_7$ isomonoolefin and a $C_4$ to $C_{14}$ multiolefin (halobutyl rubber), natural rubber, styrene-butadiene rubber, polybutadiene rubber, a terpolymer of ethylene, propylene and a non-conjugated diene (EPDM), and mixtures thereof. The preferred optional additional rubber is a chlorobutyl rubber or a bromobutyl rubber.

Furthermore, the composition may, optionally, comprise one or more rubber compounding additives, such as antioxidants, antiozonants, stabilizers, pigments and mixtures thereof. The additive may be a fatty acid such as stearic acid.

The filler may be a reinforcing filler, a non-reinforcing filler, an organic filler, an inorganic filler and mixtures thereof. Suitable fillers include talc, calcium carbonate, clay, silica, carbon black, titanium dioxide and mixtures thereof. Preferably, for non-white compositions, the preferred filler is carbon black. The carbon black may be derived from any source, such as channel blacks, furnace blacks, thermal blacks, acetylene black, lamp black and the like.

Suitable processing aids include hydrocarbonaceous oils such as an aliphatic oil, e.g. paraffinic or naphthenic oil; organic esters; other synthetic plasticizers, certain oils derived from animal fats and certain oils derived from plants, such as castor oil, olive oil, corn oil, linseed oil and the like, and mixtures thereof. The preferred processing aids are paraffinic oils, and naphthenic oils.

Optionally, the coating composition of the present invention may comprise a rubber compounding additive.

Suitable rubber compounding additives include antioxidants, antiozonants, stabilizers, pigments, fatty acids and mixtures thereof. Suitable antioxidants include hindered phenols, amino-phenols, hydroquinones, alkyldiamines, paraffin waxes, microcrystalline waxes, and mixtures thereof.

The coating composition of the present invention also comprises a curing agent.

Suitable curing agents include sulfur cures including sulfur donor cures, and resin cures. The curing agent may comprise zinc oxide or zinc stearate or mixtures thereof. Optionally, curing agent modifiers, for example, accelerators and scorch retarders, may be used. Suitable modifiers include thiurams, dithiocarbamates, thioureas, thiazoles, glycols, sulfur, and mixtures thereof. Zinc oxide-free cures may also be used, such as, for example, litharge, 2-mercaptoimidazoline, diphenyl guanidine and mixtures thereof.

The curing agent may be a resin cure such as, phenolic resins, brominated phenolic resins, resin, etc.

Suitable curing agents include resin cures such as those described in U.S. Pat. No. 3,287,440 and U.S. Pat. No. 4,059,651, the teachings of which are hereby incorporated by reference.

The preferred resin cures are phenol-formaldehyde resins in which are incorporated phenolmethylol groups, these products are known commercially and also include halogenated versions thereof.

The resin cure useful in the present invention typically includes zinc oxide as part of the curative package, generally at a concentration of about 0.5 to about 8 parts by weight per hundred of rubber (phr), preferably about 2 to about 5 phr, for example 5 phr. The curing resin itself is typically present at about 2 to about 15 phr, preferably about 3 to about 10 phr, most preferably about 4 to about 8 phr, for example at about 5 phr.

The coating composition of the present invention may comprise the halogen-containing copolymer of a $C_4$ to $C_7$ isomonoolefin and a para-alkylstyrene in an amount ranging from about 2 to 100, preferably from about 50 to about 100 phr, the filler in an amount ranging from about 10 to about 80 phr, preferably from 30 to 50 phr if carbon black is the filler or preferably from 20 to 80 if the filler is not carbon black; the processing aid in an amount up to about 25 phr, preferably from about 4 to about 10 phr, and the curing agent in an amount ranging from about 2 to 15, preferably from about 5 to 12 phr.

The term "per hundred parts of rubber" is intended herein to be based on the total hydrocarbon rubber content of the composition. Thus, if an optional additional rubber is present in the composition, the rubber in the expression "phr" is the sum of the additional rubber and the halogen-containing copolymer of a $C_4$ to $C_7$ isomonoolefin and a para-alkylstyrene.

The coating composition of the present invention may be vulcanized by subjecting it to heat according to any conventional vulcanization process. Typically, the vulcanization is conducted at a temperature ranging from about 100° C. to about 250° C., preferably from about 150° C. to about 200° C., for a time period ranging from about 1 to about 150 minutes.

The coating composition of the present invention may be used to coat fabrics, such as cotton fabrics, linen, silk, glass fabrics, synthetic fiber fabrics, such as polyamides, aramides, polyesters, rayon; leather fabrics, wool and the like.

Suitable coating compositions may be prepared by using conventional mixing techniques including, e.g., kneading, roller milling, extruder mixing, internal mixing (such as with a Banbury® mixer), etc. The sequence of mixing and temperatures employed are well known to the skilled rubber compounder, the objective being the dispersion of fillers, activators and curatives in the polymer matrix without excessive heat buildup. A useful mixing procedure utilizes a Banbury mixer in which the halogenated polymer, the filler and a process oil such as castor oil are added and the composition mixed for the desired time or to a particular temperature to achieve adequate dispersion of the ingredients. Alternatively, the rubber and a portion of the filler (e.g., one-third to two-thirds) is mixed for a short time (e.g., about 1 to 3 minutes) followed by the remainder of the filler and oil. Mixing is continued for about 5 to 10 minutes at high rotor speed during which time the mixed compound reaches a temperature of about 140° C. Following cooling, the compound is mixed with curatives in a second step to disperse the curatives at relatively low temperature, e.g., about 80 to about 120° C. Variations in mixing will be readily apparent to those skilled in the art and the present invention is not limited by the mixing procedure. The mixing is performed to disperse all components of the composition thoroughly and uniformly.

The mixed uncured composition is applied to a desired fabric in an amount sufficient to deposit a coating composition layer ranging in thickness from about 0.1 to about 1 mm on the fabric. The fabric coated with the uncured composition is subsequently subjected to vulcanization temperatures to vulcanize the composition in situ on the fabric.

Suitable vulcanization conditions include a temperature ranging from about 130 to about 200° C. and time periods ranging from about 5 to about 60 minutes. Curing time will be affected by factors such as the thickness of the coating, the concentration and type of curing agent as well as the halogen content of the halogenated polymer. However, the vulcanization parameters can readily be established with a few experiments utilizing e.g., a laboratory characterization device well known in the art, the Monsanto Oscillating Disc Cure Rheometer (described in detail in American Society for Testing and Materials, Standard ASTM D 2084).

The following example is presented to illustrate the invention.

EXAMPLE

Compositions 1 to 5 were prepared using a laboratory Banbury mixer. The components were mixed as follows: After about 2.5 minutes of preblending the polymers with the carbon black, the oil was added. Mixing was continued for another 3 minutes. Temperatures approaching 150–160° C. were recorded prior to adding the oil. After reducing the temperature of the mixture, the curing agent was added to the mixed composition on a rubber mill. The components of the composition are shown in Table I.

Compositions 1 to 4 were compositions in accordance with the present invention. Composition 5 was a composition not in accordance with the present invention. Table II shows the weight percent of para-methylstyrene and weight percent bromine and Mooney Viscosity of Polymers A through D. The physical properties of the compositions are shown in Table III. The test methods used are shown in Table IV.

TABLE I

| Compositions | 1 | 2 | 3 | 4 | 5 |
|---|---|---|---|---|---|
| Polymer A | 100.0 | | | | |
| Polymer B | | 100.0 | | | |
| Polymer C | | | 100.0 | | |
| Polymer D | | | | 100.0 | |
| Polymer E(1) | | | | | 100.0 |
| Carbon Black N330 | 40.0 | 40.0 | 40.0 | 40.0 | 40.0 |
| SP 1055(2) | | | | | 12.0 |
| Sunpar 2280(3) | 15.0 | 15.0 | 15.0 | 15.0 | 15.0 |
| Stearic Acid | 2.0 | 2.0 | 2.0 | 2.0 | 2.0 |
| Kadox 930C(4) | 1.5 | 1.5 | 1.5 | 1.5 | 5.0 |

TABLE I-continued

| Compositions | 1 | 2 | 3 | 4 | 5 |
|---|---|---|---|---|---|
| DPTHS (Tetrone A) | 1.0 | 1.0 | 1.0 | 1.0 | |
| Formula Weight | 159.5 | 159.5 | 159.5 | 159.5 | 174.0 |

Footnotes:
(1)Polymer E was Exxon butyl rubber grade 268 (Exxon Chemical Company).
(2)SP 1055 (Schenectady Chemical Company) was an alkyl phenol-formaldehyde resin.
(3)Sunpar 2280 (Sun Refining Company) was a high viscosity paraffinic oil.
(4)Kadox 930C (Zinc Corp. of America) was a surface treated zinc oxide (French Process).
(5)DPTHS (Tetrone A) was dipentamethylene thiuram hexasulfide

TABLE II

| Polymer | wt. % PMS | wt. % Br | Mooney Viscosity |
|---|---|---|---|
| Polymer A | 5.0 | 0.85 | 48 |
| Polymer B | 5.0 | 0.85 | 34 |
| Polymer C | 10.0 | 1.40 | 31 |
| Polymer D | 15.0 | 2.00 | 27 |

TABLE IV

| Property | Test |
|---|---|
| Mooney Scorch | ASTM D4818 |
| Mooney Viscosity | ASTM D1646 |
| Rheometer Cure | ASTM D2084 |
| Hardness, Shore A | ASTM D2240 |
| Tensile Strength at break, MPa | ASTM D412 |
| Elongation at break, % | ASTM D412 |
| Tensile Retained, % | ASTM D573 |
| Tear Strength | ASTM D624 |
| Air Permeability | American Intrument Co., Inc. Procedure |
| Static Ozone Resistance | ASTM 1149-81 |

What is claimed is:

1. A coating composition comprising rubbers, the rubbers consisting essentially of halogen containing rubbers said composition comprising:

(1) a halogen containing copolymer of a $C_4$ to $C_7$ isomonoolefin and a para-alkylstyrene;

(2) a filler;

(3) a processing aid;

(4) a curing agent, and (5) optionally, a chlorobutyl rubber or bromobutyl rubber.

2. The vulcanized coating composition of claim 1.

TABLE III

| Properties | 1 | 2 | 3 | 4 | 5 |
|---|---|---|---|---|---|
| MOONEY SCORCH(MS) at 132° C. | | | | | |
| Minutes to 3 Point Rise | 8.6 | 8.8 | 6.2 | 4.9 | 36.7 |
| MOONEY VISCOSITY (ML) | 52.0 | 41.0 | 38.2 | 34.2 | 44.7 |
| ML (1 + 8) at 100° C. | | | | | |
| RHEOMETER AT 160° C. | | | | | |
| 3 Degree Arc, 30 Min Motor | | | | | |
| ML, lbf-in | 11.55 | 7.80 | 7.00 | 6.50 | 8.55 |
| MH, lbf-in | 37.25 | 33.00 | 45.20 | 54.00 | 24.00 |
| TS2, minutes | 2.22 | 2.26 | 1.51 | 1.20 | 8.80 |
| T'90, minutes | 8.25 | 8.30 | 5.90 | 5.68 | 49.00 |
| MH-ML, lbf-in | 25.70 | 25.20 | 38.20 | 47.50 | 15.45 |
| ORIGINAL PHYSICAL PROPERTIES | | | | | |
| Press Cure 10 Minutes at 160° C. | | | | | |
| Hardness, Shore A | 46 | 46 | 54 | 55 | 47 |
| 100% Modulus, MPa | 0.83 | 0.83 | 1.38 | 1.97 | 0.83 |
| 300% Modulus, MPa | 3.71 | 3.60 | 6.62 | 9.55 | 3.10 |
| Tensile Strength, MPa | 15.68 | 13.62 | 12.82 | 10.67 | 14.31 |
| Elongation, % | 805 | 782 | 540 | 336 | 812 |
| TEAR STRENGTH | | | | | |
| Die C at 25 C., kN/m | 41.22 | 37.48 | 37.42 | 28.12 | 31.64 |
| AIR PERMEABILITY AT 66° C. | | | | | |
| Sample A, Q × 10^3(1) | 2.31 | 2.34 | 2.18 | .2.14 | 2.24 |
| Sample B, Q × 10^3(1) | 2.27 | 2.29 | 2.15 | 2.31 | 2.28 |
| Average | 2.29 | 2.32 | 2.17 | 2.23 | 2.26 |
| STATIC OZONE RESISTANCE | | | | | |
| 100 PPHM, 20% Extension, 40° C. | | | | | |
| Time to Crack, Hours | | | | | |
| Sample A | >1000 | >1000 | >1000 | >1000 | 96 |
| Sample B | >1000 | >1000 | >1000 | >1000 | 120 |
| AIR OVEN AGING | | | | | |
| 168 Hours at 150° C. | | | | | |
| Hardness, Shore A | 50 | 51 | 60 | 66 | 52 |
| 100% Modulus, MPa | 0.87 | 0.93 | 1.95 | 3.34 | 1.23 |
| 300% Modulus, MPa | 3.58 | 3.65 | 9.17 | | 4.40 |
| Tensile Strength, MPa | 12.16 | 10.66 | 12.19 | 10.95 | 6.36 |
| Elongation, % | 745 | 708 | 387 | 226 | 452 |
| Hardness Change, Pts. | 4 | 5 | 6 | 11 | 5 |
| Tensile Retained, % | 78 | 78 | 95 | 103 | 44 |
| Elongation Retained, % | 93 | 90 | 72 | 67 | 56 |

Footnote (1)
Q = cubic feet of air (at 32° F., 29.92 inch Hg) diffusing through 0.001 inch thickness of material under pressure differential of 1 psi per square foot per day.

3. The coating composition of claim 1, wherein said filler is selected from the group consisting of talc, calcium carbonate, clay, silica, carbon black, titanium dioxide, and mixtures thereof.

4. The coating composition of claim 1, wherein said filler comprises carbon black.

5. The coating composition of claim 1, additionally comprising a rubber compounding additive.

6. The coating composition of claim 1, wherein said copolymer is present in an amount ranging from about 2 to about 100 parts by weight per hundred parts of rubber (phr); said filler is present in an amount ranging from about 10 to about 80 phr, said processing aid is present in an amount up to about 25 phr, and said curing agent is present in an amount ranging from about 2 to about 15 phr.

7. The coating composition of claim 1, wherein said copolymer comprises from about 0.5 to about 20 weight percent of said para-alkylstyrene.

8. The coating composition of claim 1, wherein said copolymer comprises from about 1 to about 20 weight percent of said para-alkylstyrene.

9. The coating composition of claim 1, wherein said copolymer comprises from an effective amount above zero to about 7.5 weight percent of said halogen.

10. The coating composition of claim 1, wherein said halogen is selected from the group consisting of chlorine, bromine, and mixtures thereof.

11. The coating composition of claim 1, wherein said halogen comprises bromine.

12. The coating composition of claim 1, wherein said isomonoolefin is isobutylene and said para-alkylstyrene is para-methylstyrene.

13. The coating composition of claim 1, wherein said processing aid is a hydrocarbonaceous oil.

14. The coating composition of claim 1, wherein said curing agent comprises a phenolic resin.

15. The coating composition of claim 14, wherein said phenolic resin is a phenol-formaldehyde resin comprising phenolmethylol groups.

16. The coating composition of claim 14, additionally comprising a curing agent modifier selected from the group consisting of sulfur, thiuram, a dithiocarbamate, a thiourea, a thiazole, a glycol and mixtures thereof.

17. The coating composition of claim 1 further consisting of a rubber selected from the group consisting of chlorobutyl rubber and bromobutyl rubber.

18. A coating composition comprising rubbers, the rubbers consisting of halogen-containing rubbers, said composition comprising:

(1) A halogen containing copolymer of a $C_4$ to $C_7$ isomonoolefin and a para-alkylstyrene;

(2) a filler;

(3) a processing aid; and (4) a curing agent.

19. The coating composition in accordance with claim 18 further comprising a chlorobutyl rubber or bromobutyl rubber.

* * * * *